(12) United States Patent
Dorris et al.

(10) Patent No.: US 8,205,847 B2
(45) Date of Patent: Jun. 26, 2012

(54) CONNECTION SYSTEM FOR MOUNTING A DEVICE ONTO A SUPPORT ARM

(75) Inventors: Jeffrey K. Dorris, Wetumpka, AL (US); Alan R. Williams, Reno, TX (US)

(73) Assignee: American Sterilizer Company, Mentor, OH (US)

( * ) Notice: Subject to any disclaimer, the term of this patent is extended or adjusted under 35 U.S.C. 154(b) by 55 days.

(21) Appl. No.: 12/613,647

(22) Filed: Nov. 6, 2009

(65) Prior Publication Data

US 2011/0108689 A1 May 12, 2011

(51) Int. Cl.
*A47H 1/10* (2006.01)
(52) U.S. Cl. .................................. 248/317; 248/222.52
(58) Field of Classification Search .................. 248/325, 248/331, 348, 217.1, 317, 321, 323, 320, 248/327, 343, 648, 222.52, 292.11, 288.11, 248/276.1, 651; 403/46, 43, 92, 348; 70/62, 70/2; 5/658; 340/286.07
See application file for complete search history.

(56) References Cited

U.S. PATENT DOCUMENTS

| | | | | |
|---|---|---|---|---|
| 4,629,154 A * | 12/1986 | Kataczynski | ................. | 248/610 |
| 7,789,361 B2 * | 9/2010 | Bally et al. | ................. | 248/229.2 |
| 7,845,601 B1 * | 12/2010 | Culpepper et al. | ......... | 248/125.2 |
| 7,884,735 B2 * | 2/2011 | Newkirk | ..................... | 340/691.6 |
| 2003/0230702 A1 * | 12/2003 | Welling et al. | ................ | 248/694 |
| 2005/0230575 A1 * | 10/2005 | Zelenski et al. | ............ | 248/176.1 |
| 2005/0253034 A1 * | 11/2005 | Bally et al. | ................. | 248/276.1 |
| 2006/0038098 A1 * | 2/2006 | Metz et al. | ................. | 248/229.1 |
| 2006/0179571 A1 * | 8/2006 | Newkirk | ........................... | 5/600 |
| 2007/0023587 A1 * | 2/2007 | Eggleston et al. | .............. | 248/98 |
| 2008/0149788 A1 * | 6/2008 | Wong et al. | ................. | 248/176.1 |

* cited by examiner

*Primary Examiner* — Terrell McKinnon
*Assistant Examiner* — Eret McNichols
(74) *Attorney, Agent, or Firm* — Kusner & Jaffe; Michael A. Centanni

(57) ABSTRACT

The present invention provides a connection system for attaching and detaching a device to and from a support arm. The connection system is comprised of a key member having a keyed portion. A first section is attachable to a support arm. The first section is dimensioned to receive the keyed portion of the key member. A second section is attachable to a device. The second section is dimensioned to attach to the first section. An actuator is operable to move between a first position and a second position. The second section is locked to the first section when the actuator is in the first position. The second section is detachable from the first section when the key member is locked to the first section and the actuator is in the second position.

14 Claims, 18 Drawing Sheets

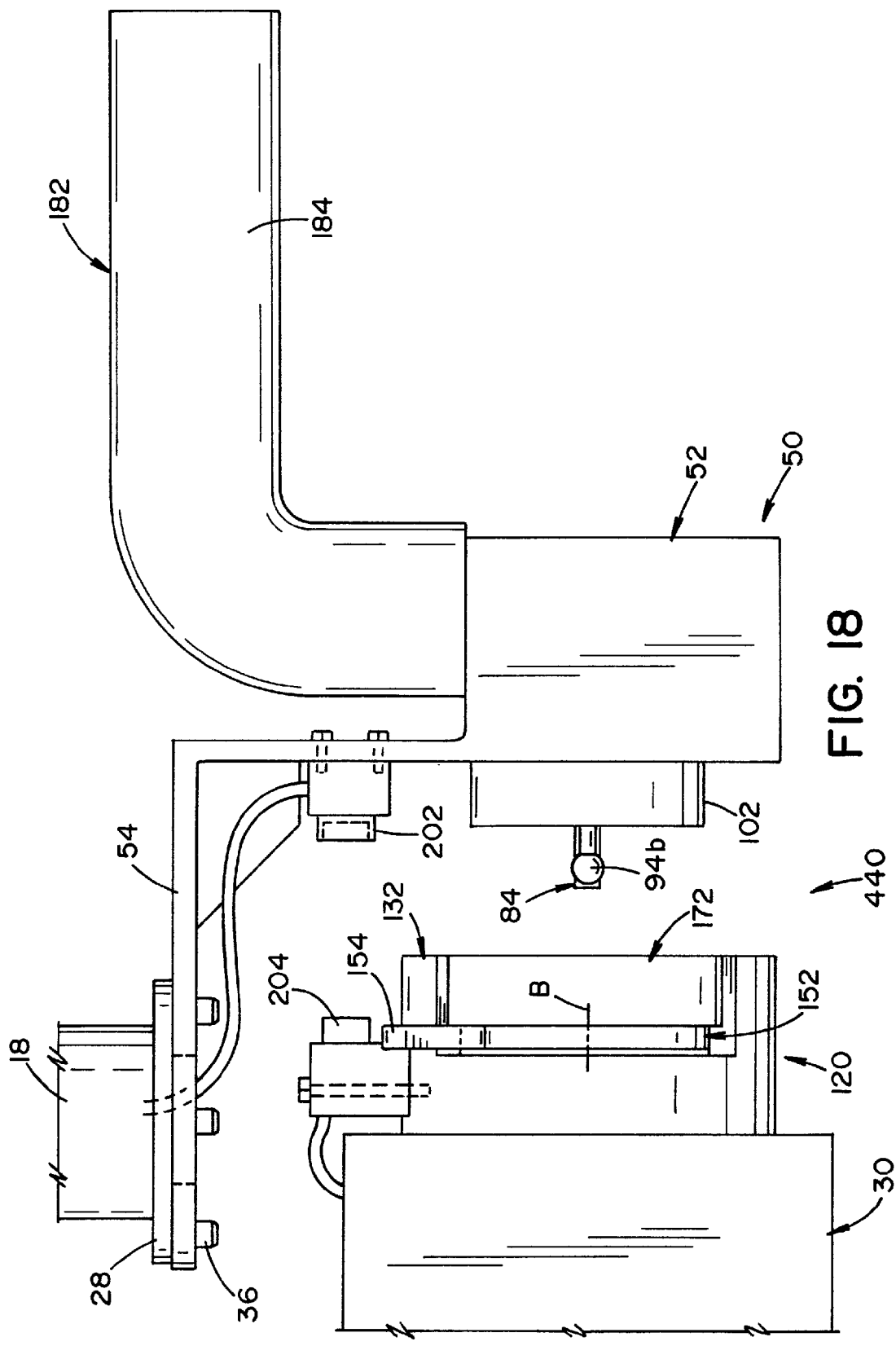

CONNECTION SYSTEM FOR MOUNTING A DEVICE ONTO A SUPPORT ARM

FIELD OF THE INVENTION

The present invention relates generally to a ceiling-mounted, surgical camera system for use in a surgical theater, and more particularly, to a system for attaching and detaching a device to and from a support arm. The present invention is particularly applicable to a connection system for attaching and detaching a camera to and from a spring-loaded support arm of a ceiling-mounted, surgical camera system and will be described with particular reference thereto. It being appreciated, however, that the present invention finds advantageous application in other types of apparatus wherein a device is attached and detached from a support arm.

BACKGROUND OF THE INVENTION

Cameras are used in surgical and operating rooms to take images of an operation site during a surgical procedure. The images taken by the camera may be displayed on video monitors, recorded for training purposes or transmitted to remote sites.

The camera typically is attached to a ceiling-mounted support arm. The support arm includes multiple sections that are connected by articulating joints that allow the camera to be properly positioned during a surgical procedure. The support arm also includes loaded springs therein that are designed to compensate for the weight of the camera. However, when the camera is removed from the support arm, the loaded springs cause the support arm to become imbalanced. As a result of the imbalance, the end of the support arm will recoil rapidly, which can potentially cause injury to a user.

The present invention provides a connection system for safely and quickly attaching and detaching a device to and from a support arm.

SUMMARY OF THE INVENTION

In accordance with one embodiment of the present invention, there is provided a connection system for attaching and detaching a device to and from a support arm. The connection system is comprised of a first connection section, a second connection section and a key member having a keyed portion. The first connection section is attachable to a support arm, and is dimensioned to receive the keyed portion of the key member. The second connection section is attachable to a device, and is dimensioned to attach to the first connection section. An actuator is operable to move between a first position and a second position. The second connection section is locked to the first connection section when the actuator is in the first position. The second connection section is detachable from the first connection section when the key member is locked to the first connection section and the actuator is in the second position.

In accordance with another aspect of the present invention, there is provided a surgical camera system for supporting a medical device. The system is comprised of a support arm, a medical device, and a connection system operable to attach and detach the medical device to and from the support arm. The connection system is comprised of a first connection section, a second connection section and a key member having a keyed portion. The first connection section is attachable to a support arm, and is dimensioned to receive the keyed portion of the key member. The second connection section is attachable to a medical device, and is dimensioned to attach to the first connection section. An actuator is operable to attach and detach the second connection section to and from the first connection section when the key member engages the first connection section. The second connection section is detachable from the first connection section when the key member is locked to the first connection section and the actuator is in a second position. The second connection section is locked to the first connection section when the key member is detached from the first connection section and the actuator is in a first position.

An advantage of the present invention is a connection system that allows for the safe and quick attachment and detachment of a device to and from a support arm.

Another advantage of the present invention is a connection system as described above that compensates for an imbalance in force when a device is removed from a support arm.

Another advantage of the present invention is a connection system as described above that allows a single user to safely and quickly attach and detach a device to and from a support arm.

Another advantage of the present invention is a connection system as described above that allows for the safe removal of a device from a spring-loaded support arm.

Another advantage of the present invention is a connection system as described above that attaches a weighted key member onto a support arm to offset the weight lost when a device is detached from the support arm.

Another advantage of the present invention is a connection system as described above that secures a device onto a support arm.

Another advantage of the present invention is a connection system as described above that allows a single user to use one hand to attach and detach a device to and from a support arm while supporting the device with the other hand.

Another advantage of the present invention is a connection system as described above that secures a key member onto a support arm when a device is detached from the support arm and vice versa.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 18 is an alternate embodiment of the present invention showing electrical connectors for electrically connecting a first connection section to a second connection section.

DETAILED DESCRIPTION OF PREFERRED EMBODIMENT

Figure 1:
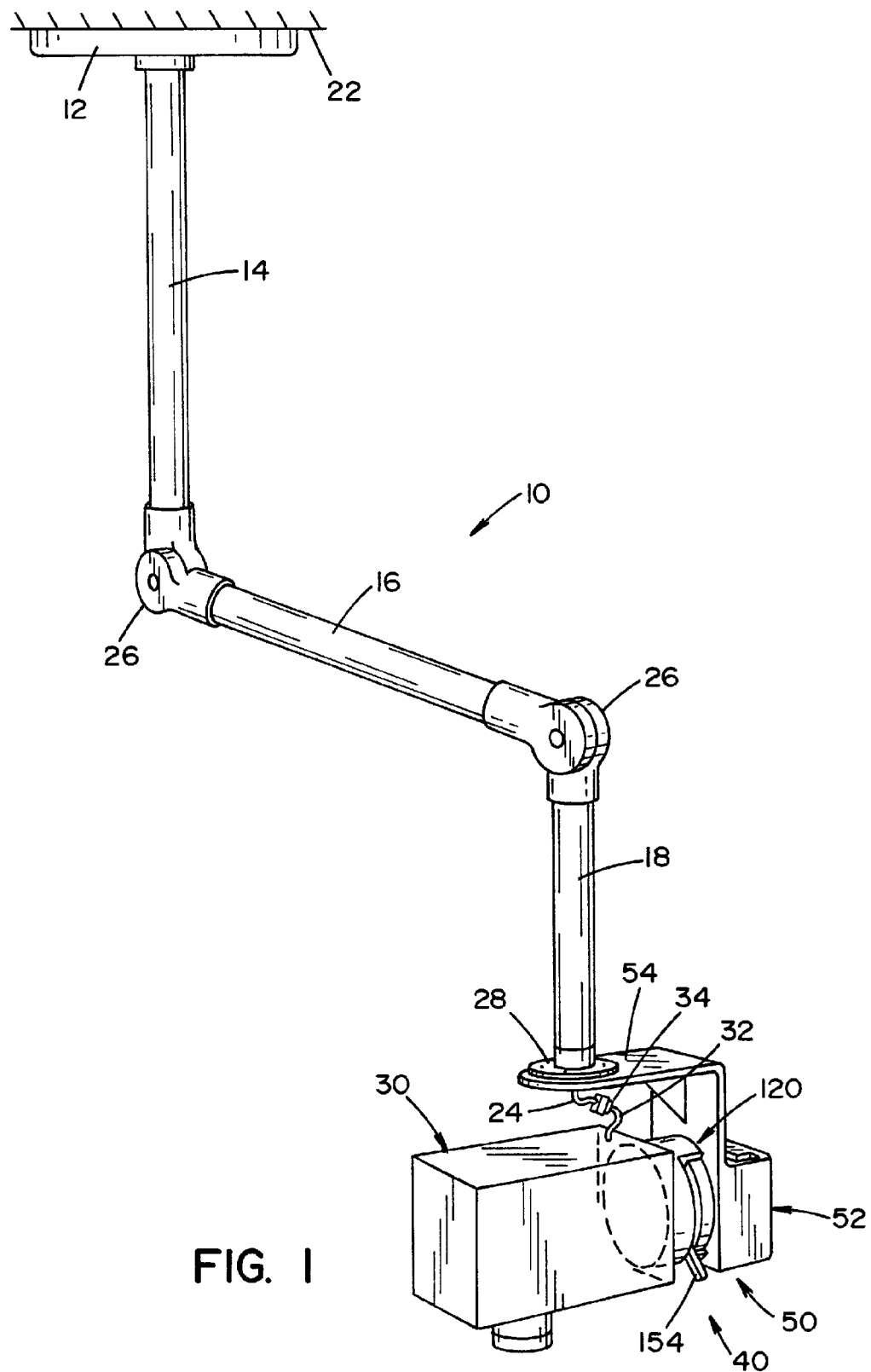
FIG. 1 is a perspective view of a ceiling-mounted, articulating arm having a camera attached thereto.

Referring now to the drawings wherein the showings are for the purpose of illustrating a preferred embodiment of the invention only, and not for the purpose of limiting same, FIG. 1 shows a ceiling-mounted, articulating arm 10 supporting a medical device 30. In the embodiment shown, device 30 is a camera used in surgical operating rooms.

Figure 2:
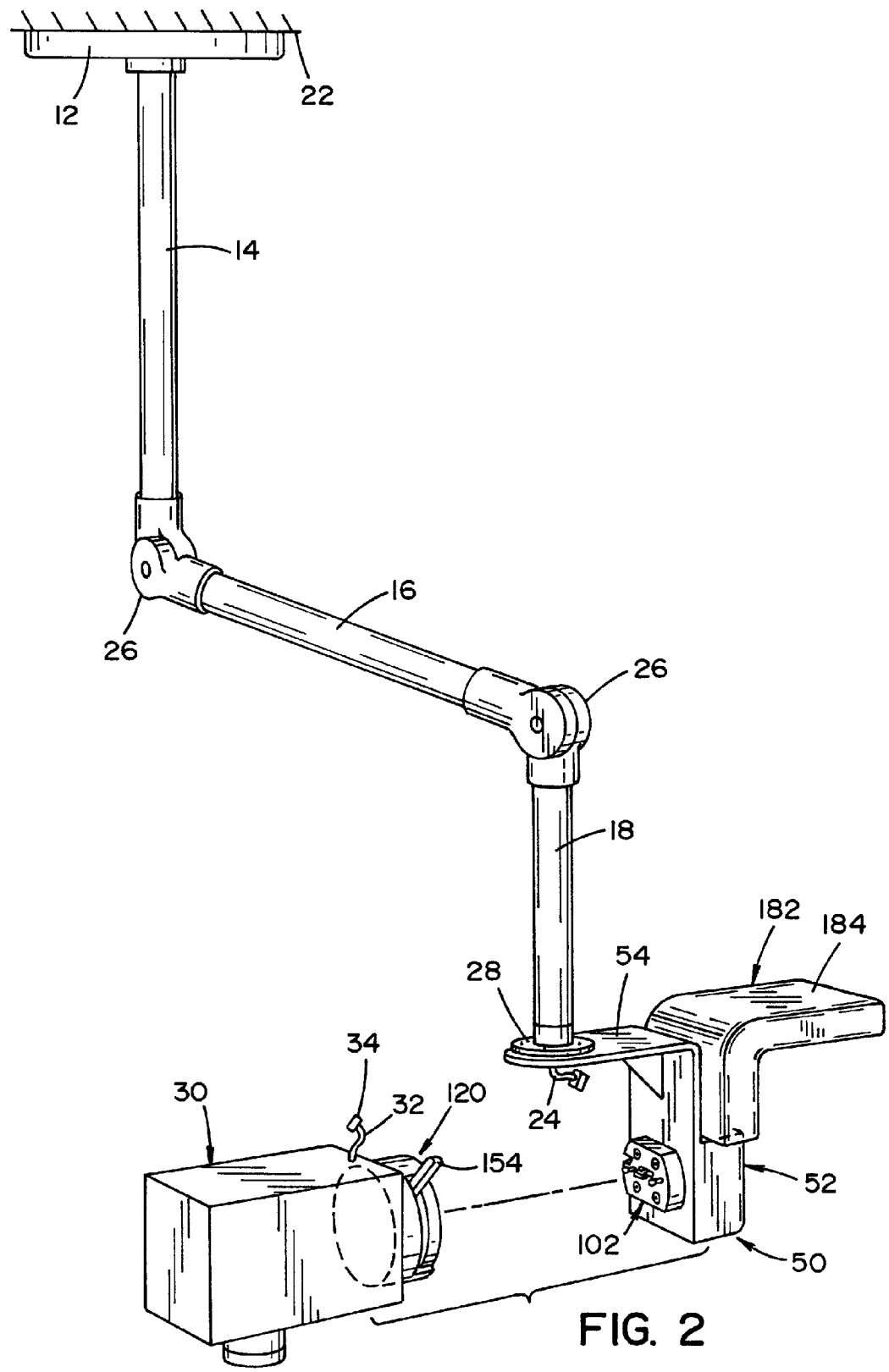
FIG. 2 is a perspective view of a ceiling-mounted, articulating arm having a key member attached thereto and a camera detached therefrom.

As best seen in FIGS. 1 and 2, arm 10 includes a mounting plate 12, a vertical arm member 14, an intermediate arm member 16 and a lower arm member 18. Mounting plate 12 is attached to a ceiling 22. A vertical arm member 14 is attached to mounting plate 12. Intermediate arm member 16 is connected to vertical arm member 14 and lower arm member 18 by articulating joints 26. Vertical arm member 14, intermediate arm member 16 and lower arm member 18 are tubular in shape and define an inner passage (not shown) through which data carrying cables and wires 24 are arranged. Springs (not shown) are disposed in the inner passage of vertical arm member 14, intermediate arm member 16 and lower arm member 18. The internal springs and joints 26 allow a free end of arm 10 to be positioned at a desired location. A flange 28 is attached to the free end of arm 10.

Device 30 is attached to arm 10 by a connection system 40. Device 30 includes a cable 32 with a connector 34 disposed on an end thereof. The spring constants of the springs in intermediate arm member 16 are selected to compensate for the weight of device 30 when device 30 is attached to arm 10.

As best seen in FIG. 2, a connection system 40 is provided to releasably attach device 30 to arm 10. Connection system 40 includes a first connection section 50 attachable to arm 10 and a second connection section 120 attachable to device 30.

In the embodiment shown, first connection section 50 includes a bracket 54 for attachment to arm 10. Fasteners 36, best seen in FIG. 6, attach bracket 54 to flange 28 on lower arm member 18.

Figure 3:
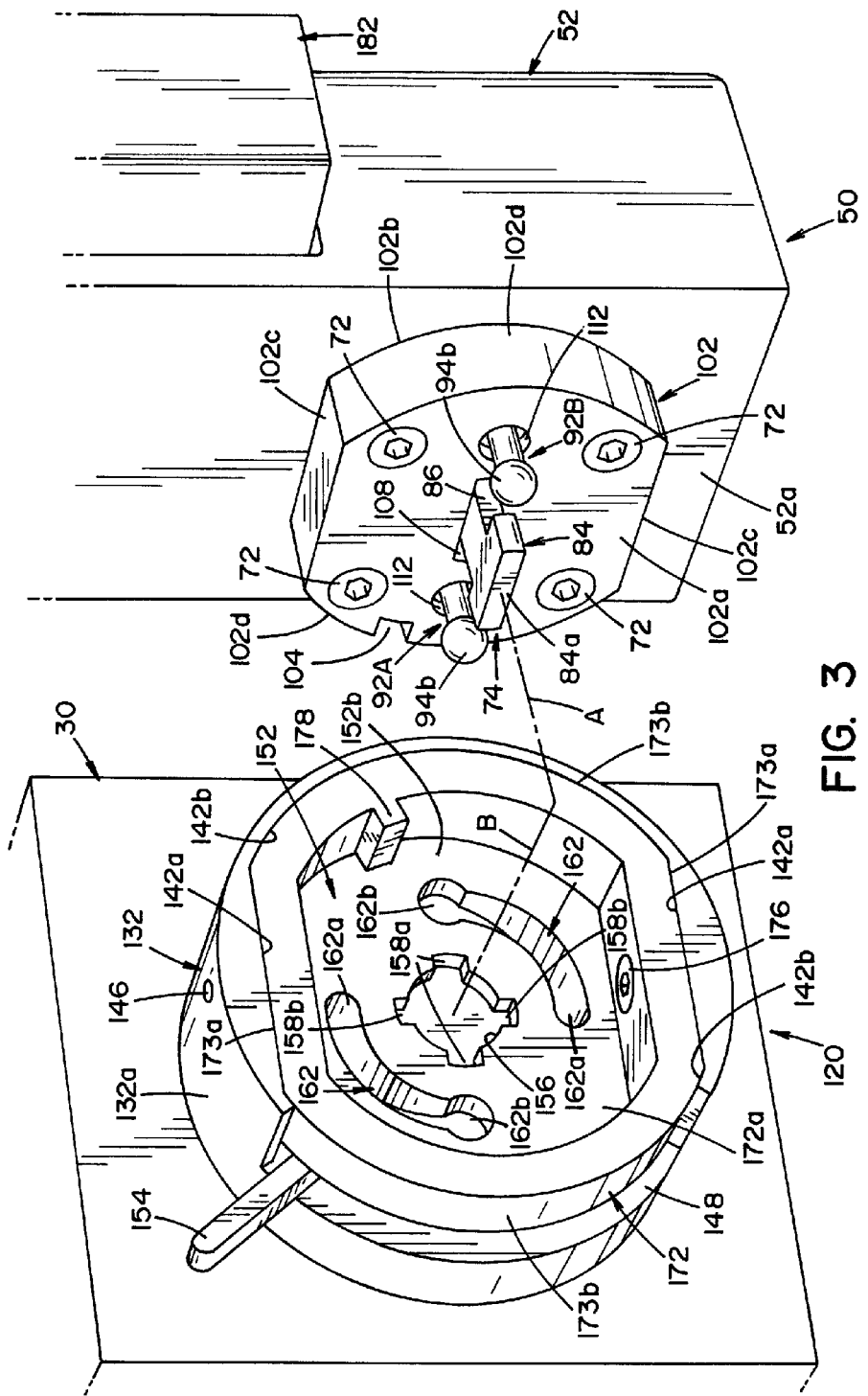
FIG. 3 is an enlarged perspective view of a connection system showing a first connection section of the connection system separated from a second connection section of a connection system.
Figure 4:
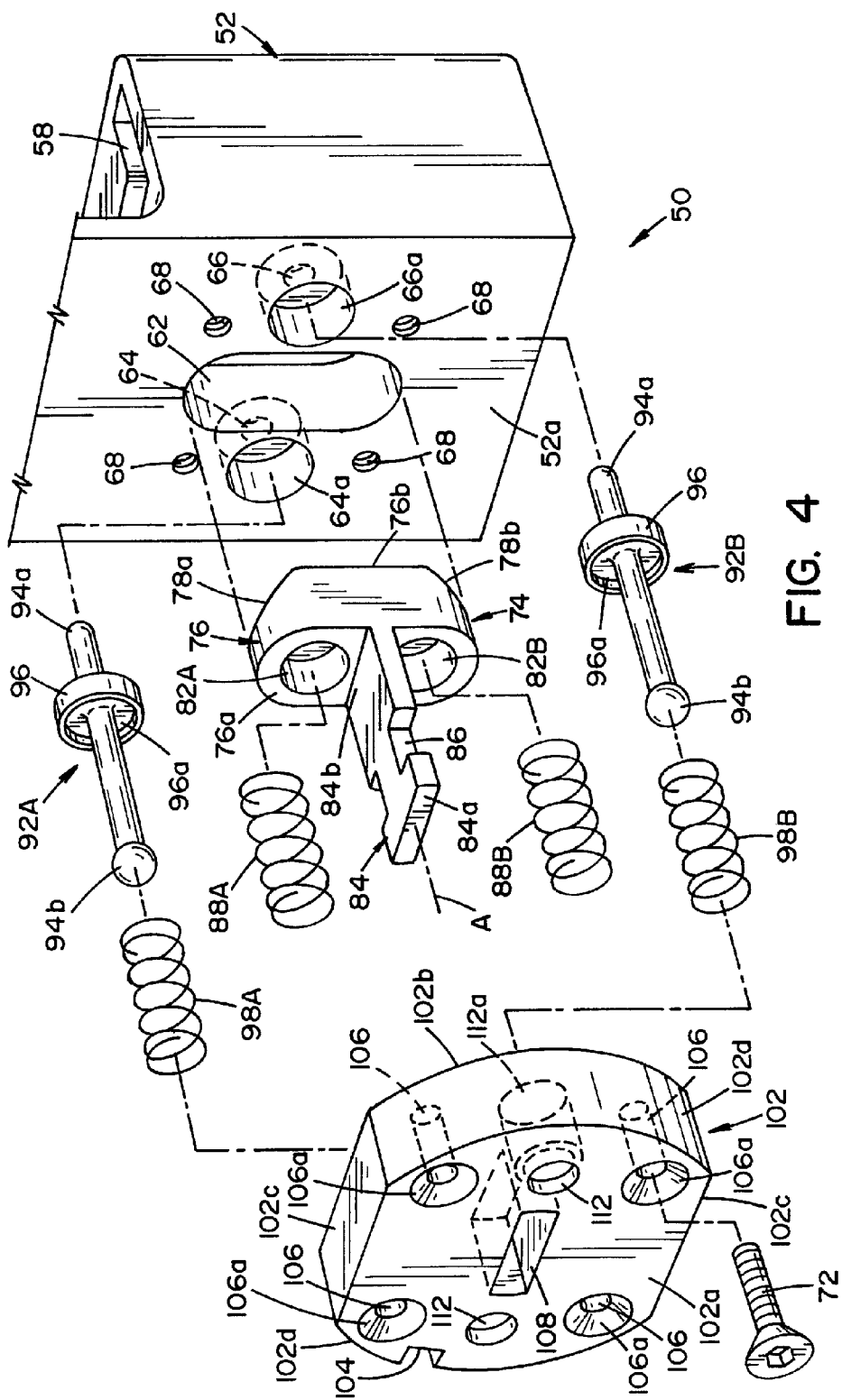
FIG. 4 is an enlarged, exploded perspective view showing the first connection section of the connection system shown in FIG. 3.

Referring now to FIGS. 3 and 4, first connection section 50 is best seen. First connection section 50 generally includes a body portion 52. Body portion 52 is a generally rectangular shaped element. A keyway 58 extends into body portion 52, as best seen in FIG. 4. In the embodiment shown, keyway 58 has a generally C-shaped cross-section and extends downwardly through body portion 52. An obround opening 62, best seen in FIG. 4, is formed in a front surface 52a of body portion 52. In the embodiment shown, opening 62 has rounded ends. Opening 62 extends inwardly to communicate with keyway 58 in body portion 52. Holes 64, 66 are formed on opposite sides of opening 62. Holes 64, 66 extend through body portion 52 and communicate with keyway 58. Holes 64, 66 each include a counter-bored section 64a, 66a that is formed in front surface 52a of body portion 52. Four (4) threaded holes 68 are disposed around opening 62. Holes 68 extend partially into body portion 52.

First connection section 50 includes a latch 74. As best seen in FIG. 4, latch 74 is a generally T-shaped member with a base portion 76 and a tab portion 84. Base portion 76 is a generally obround and is dimensioned such that a portion of latch 74 slidingly moves within opening 62 in body portion 52. Base portion 76 includes a flat front surface 76a and a flat rear surface 76b. Rear surface 76b is chamfered to form ramped sections 78a, 78b. Cylindrical bored cavities 82A, 82B are formed in front surface 76a of base portion 76. A cylindrical side surface and a flat circular bottom surface define cavities 82A, 82B. Cavity 82A is disposed above cavity 82B. Cavities 82A, 82B are dimensioned to accept compression springs 88A, 88B, respectively. Tab portion 84 is a generally flat, rectangular member with a first end 84a and a second end 84b. Notches are formed on opposite sides of tab portion 84 near first end 84a to form a throat or neck 86 of tab portion 84. In the embodiment shown, the notches are rectangular in shape. Tab portion 84 is attached to front surface 76a of base portion 76 between cavities 82A, 82B.

A pair of locking pins 92A, 92B are provided to slidingly move within holes 64, 66 and counter-bores 64a, 66a of body portion 52. Pins 92A, 92B are identical and as such, only pin 92A shall be described in detail. Pin 92A is an elongated element having a first end 94a and an enlarged second end 94b. In the embodiment shown, second end 94b is spherical-shaped. Pin 92A includes a cylindrical flange 96. An annular recess 96a is formed in one side of flange 96. Recess 96a is dimensioned to receive an end of spring 98A. Locking pins 92A, 92B are dimensioned to receive springs 98A, 98B, respectively.

A plate 102 is provided to capture and retain latch 74, locking pins 92A, 92B and springs 88A, 88B, 98A, 98B in body portion 52. Plate 102 is a generally flat circular member having a flat front surface 102a, a flat rear surface 102b and an outer surface. The outer surface of plate 102 is generally cylindrical in shape and includes two (2) flat outer surfaces 102c disposed between two (2) curved outer surfaces 102d. A notch 104 is formed in one curved outer surface 102d. In the embodiment shown, notch 104 is rectangular in shape. Four (4) holes 106 extend through plate 102. Each hole 106 includes a countersunk portion 106a that is formed in front surface 102a of plate 102. Holes 106 accept fasteners 72. An opening 108 extends through plate 102. Opening 108 is dimensioned to receive tab portion 84 of latch 74 therethrough. In the embodiment shown, opening 108 is rectangular-shaped and extends through a center of plate 102. Holes 112, on opposite sides of opening 108, extend through plate 102. Each hole 112 includes a counter-bored section 112a that is formed in rear surface 102b of plate 102. Holes 112 receive locking pins 92A, 92B therethrough.

Holes 106 in plate 102 are dimensioned and positioned to be in registry with holes 68 in body portion 52. Fasteners 72 extend through holes 106 of plate 102 into holes 68 of body portion 52 to attach plate 102 to body portion 52. Latch 74 is operable to move along a central axis "A" of first connection section 50 between a first latch position, shown in FIG. 7, and a second latch position, shown in FIG. 14. When latch 74 is in the first latch position, rear surface 76b of latch 74 contacts a rear wall of keyway 58 such that neck 86 of latch 74 is disposed in opening 108. When latch 74 is in the second latch position, neck 86 of latch 74 is disposed beyond front surface 102a of plate 102, as shall be described in greater detail below. Springs 88A, 88B bias latch 74 towards the first latch position. One end of springs 88A, 88B is disposed in cavities 82A, 82B of latch 74. Another end of springs 88A, 88B contacts rear surface 102b of plate 102.

Locking pins 92A, 92B are movably retained within body portion 52 by plate 102. Holes 112 in plate 102 are dimensioned and positioned to be in registry with holes 64, 66 in body portion 52. Pins 92A, 92B extend through holes 112 in plate 102 and holes 64, 66 in body portion 52. Pins 92A, 92B slidingly move such that first end 94a of pins 92A, 92B slidingly moves within holes 64, 66 and flange 96 of pins 92A, 92B slidingly move within counter-bores 64a, 66a of holes 64, 66. Pins 92A, 92B are operable to move between a first pin position, shown in FIG. 7, and a second pin position, shown in FIG. 14. When pins 92A, 92B are in the first pin position, first ends 94a of pins 92A, 92B are disposed in holes 64, 66 of body portion 52 and second end 94b of pins 92A, 92B extend beyond front surface 102a of plate 102. When pins 92A, 92B are in the second pin position, first end 94a extends into keyway 58 of body portion 52, flange 96 rests on the flat bottom of counter-bore 64a, 66a and second end 94b extends slightly beyond front surface 102a of plate 102. As stated above, pins 92A, 92B are designed to accept compression springs 98A, 98B. One end of springs 98A, 98B is disposed in recess 96a of flange 96. Another end of springs 98A, 98B is disposed in counter-bored section 112a of holes 112. Springs 98A, 98B bias pins 92A, 92B to the second pin position.

Figure 5:
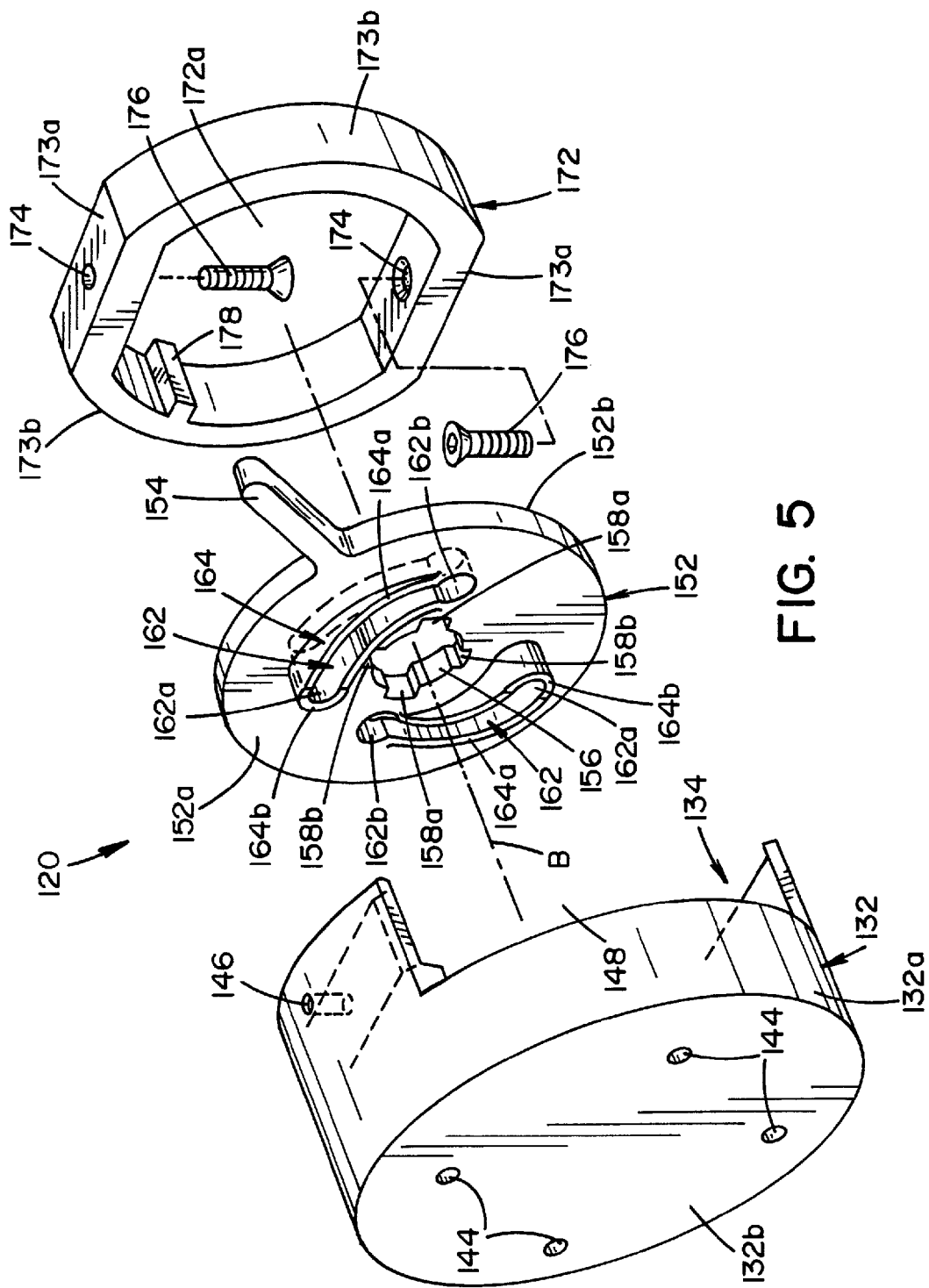
FIG. 5 is an enlarged, exploded perspective view showing the second connection section of the connection system shown in FIG. 3.
Figure 7:
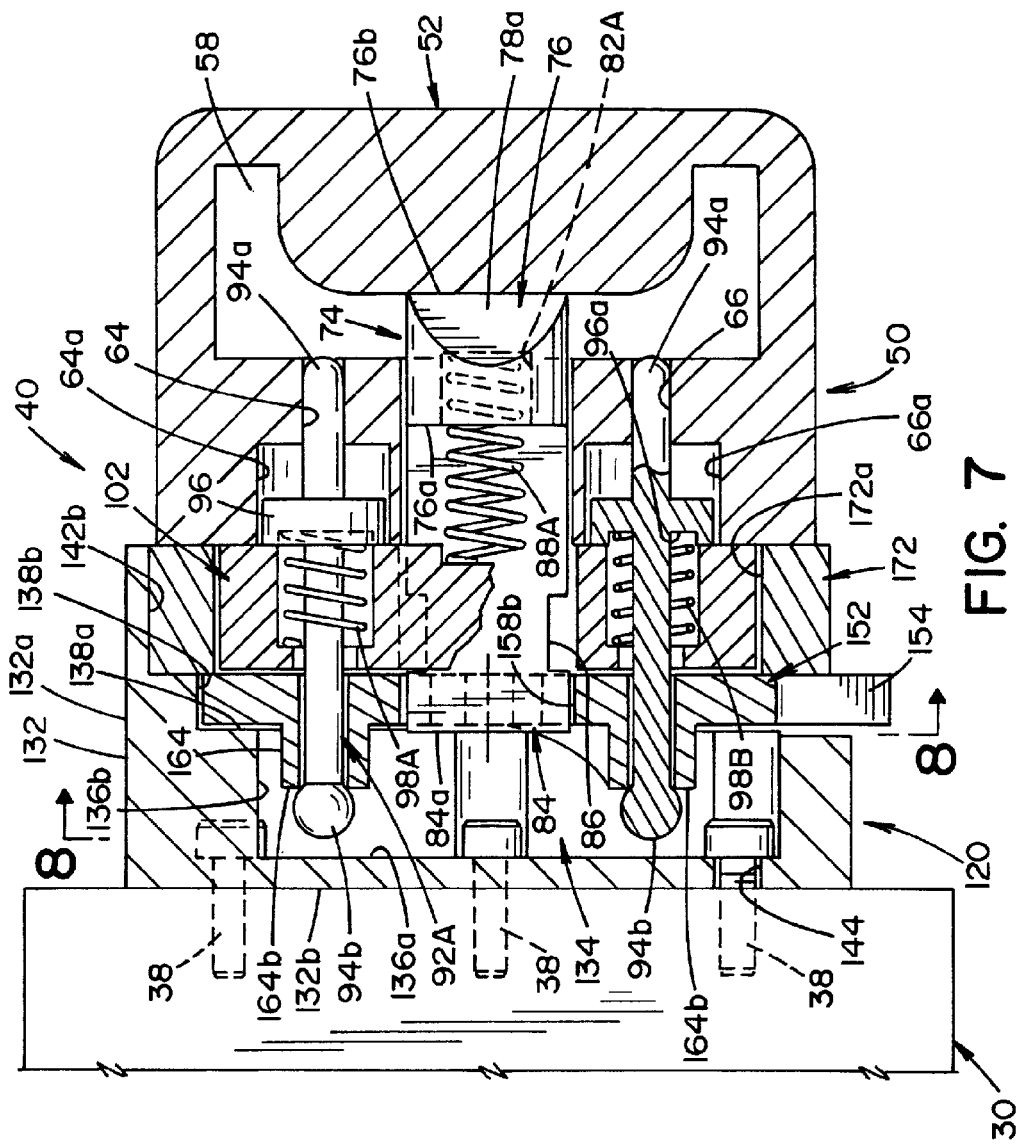
FIG. 7 is an enlarged sectional view taken along lines 7-7 in FIG. 6.

Referring now to FIGS. 3, 5 and 7, second connection section 120 is best seen. Second connection section 120 includes a housing 132, as shown in FIG. 5. Housing 132 is generally a cup-shaped element having a cylindrical side wall 132a, and a flat, circular bottom 132b. A cavity 134 is defined by a stepped, inner surface of side wall 132a. As best seen in FIG. 7, a flat, circular surface 136a and a first cylindrical side surface 136b define a lower portion of side wall 132a. An outward-facing annular surface 138a and a second cylindrical side surface 138b define a middle portion of side wall 132a. An upper portion of side wall 132a is defined by two (2) flat surfaces 142a disposed between two curved surfaces 142b. Two (2) threaded holes 146 extend through side wall 132a of housing 132 at flat surfaces 142a. Four (4) equally-spaced holes 144 are formed in bottom 132b and communicate with cavity 134. Cut-outs are formed in side wall 136b to allow screws 38 to be inserted into holes 144, as best seen in FIG. 7. A portion of side wall 132a is removed to define an opening 148, as best seen in FIG. 5.

An actuator 152 is dimensioned to be received into housing 132. Actuator 152 is a generally flat, circular plate having a flat first surface 152a on one side and a flat second surface 152b on the other side thereof. A lever arm 154 extends radially outward from an edge of actuator 152. In the embodiment shown, lever arm 154 is a rectangular member with a rounded end. A hole 156 extends through a center of actuator 152 along a central axis thereof. A first pair of notches 158a and a second pair of notches 158b are formed in actuator 152 around hole 156. Notches 158a, 158b extend radially outward from the central axis of actuator 152. First pair of notches 158a are radially aligned and disposed opposite each other. Second pair of notches 158b are radially aligned and disposed opposite each other. A pair of curved slots 162 extends axially through actuator 152. Slots 162 include a first end 162a and an enlarged second end 162b. In the embodiment shown, second end 162b is circular in shape. First end 162a of slots 162 are radially aligned with second pair of notches 158b in actuator 152. Second end 162b of slots 162 are radially aligned with first pair of notches 158a in actuator 152, as shown in FIG. 5. Slots 162 have a radius of curvature that corresponds to a center of hole 156. A wall 164 extends from first surface 152a around each curved slot 162. Wall 164 has a ramped upper surface 164a and a flat upper surface 164b. Ramped upper surface 164a extends from enlarged second end 162b to first end 162a of slots 162. Flat upper surface 164b extends around first end 162a.

A retaining member 172 is dimensioned to be received into the upper portion of side wall 132a. Retaining member 172 is a ring-shaped element that defines an opening 172a. Retaining member 172 includes two (2) opposing, flat wall sections 173a that are disposed between two (2) curved, cylindrical wall sections 173b. A counter-sunk hole 174 extends through each flat wall section 173a from an inner surface of retaining member 172. Holes 174 are dimensioned to accept fasteners 176. A locating key 178 is formed on the inner surface of one curved wall section 173b of retaining member 172. In the embodiment shown, locating key 178 is rectangular in shape.

Housing 132 is secured to device 30 by fasteners 38. Holes 144 in housing 132 are dimensioned and positioned to be in registry with holes in device 30, such that fasteners 38 extend through holes 144 of housing 132 into device 30. Actuator 152 is dimensioned to be rotatably disposed in the middle portion of housing 132 such that lever arm 154 extends through opening 148 in housing 132. Actuator 152 is rotatable about a central axis "B" of second connection section 120 between a first actuator position, shown in FIG. 8, and a second actuator position, shown in FIG. 15. Retaining member 172 is disposed in the upper portion of housing 132 such that actuator 152 is rotatably retained in cavity 134 in housing 132. Holes 174 in retaining member 172 are dimensioned and positioned to be in registry with threaded holes 146 in housing 132. Fasteners 176 extend through holes 174 in retaining member 172 into threaded holes 146 in housing 132 to secure retaining member 172 in cavity 134 of housing 132.

Figure 9:
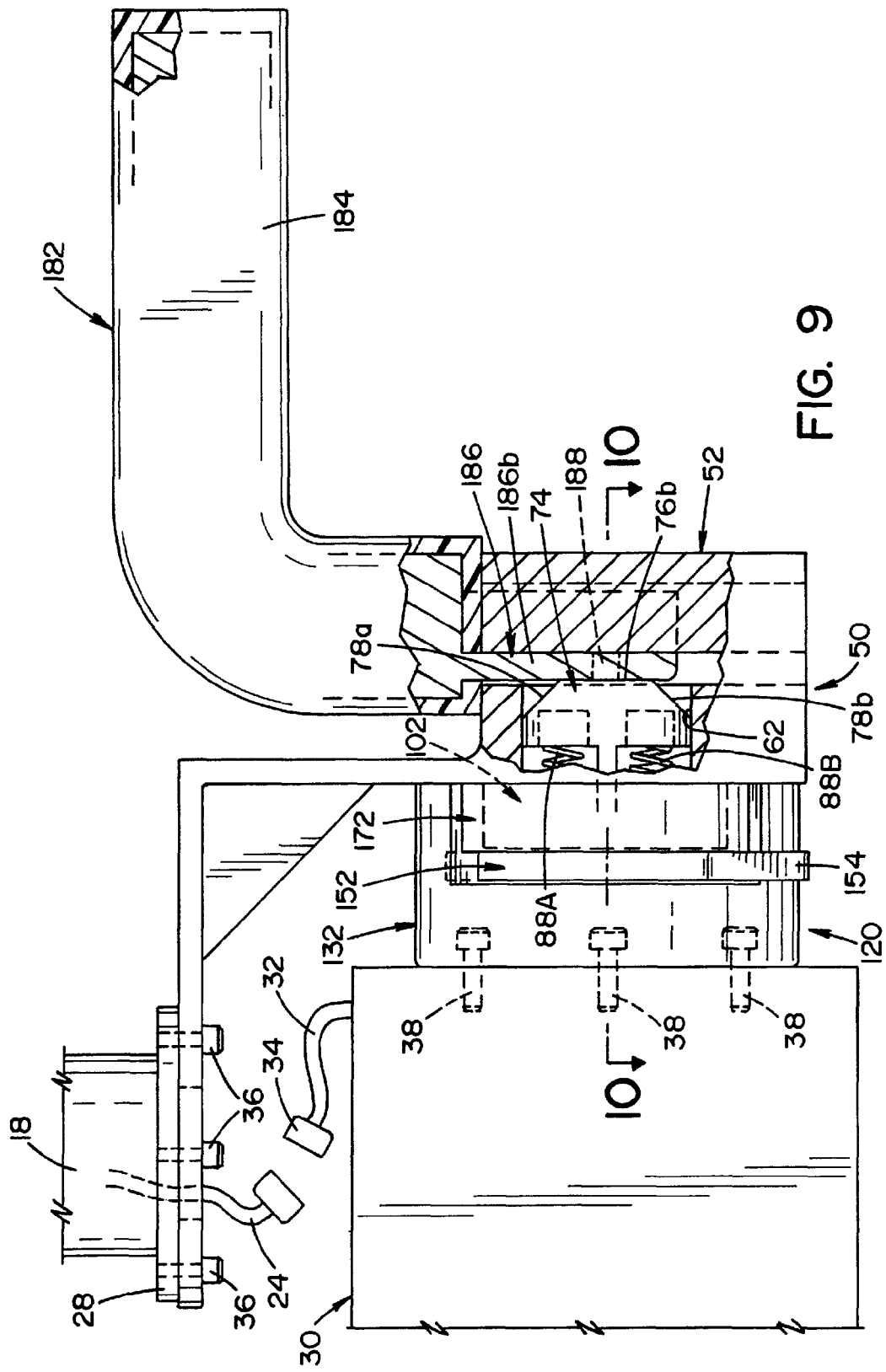
FIG. 9 is a partially sectioned, side-elevation view showing a connection system in a first position with a key member attached to the connection system.

Referring now to FIGS. 2 and 9, a key member 182 is best seen. Key member 182 includes a body portion 184 and a keyed portion 186. Body portion 184 is a formed piece of metal that is coated with a plastic material. In the embodiment shown in FIG. 9, body portion 184 is a generally L-shaped member having a first leg and a second leg. Body portion 184 has a weight that is related to the weight of device 30. Keyed portion 186 extends from body portion 184 of key member 182. In the embodiment shown, keyed portion 186 has a C-shaped cross-section with two shorter leg portions 186a and a central portion 186b. Holes 188 extend through central portion 186b of keyed portion 186. Holes 188 are dimensioned and positioned to be in registry with holes 64, 66 in first connection section 50 when keyed portion 186 is inserted into keyway 58 in first connection section 50.

The present invention shall now be further described with respect to the detachment of device 30 from arm 10. As best seen in FIG. 3, central axis "A" of first connection section 50 aligns with central axis "B" of second connection section 120. Either second connection section 120 or key member 182 is always attached to first connection section 50. The release of second connection section 120 may not take place until key member 182 is locked to first connection section 50. The removal of key member 182 from first connection section 50 locks second connection section 120 onto first connection section 50.

Figure 6:
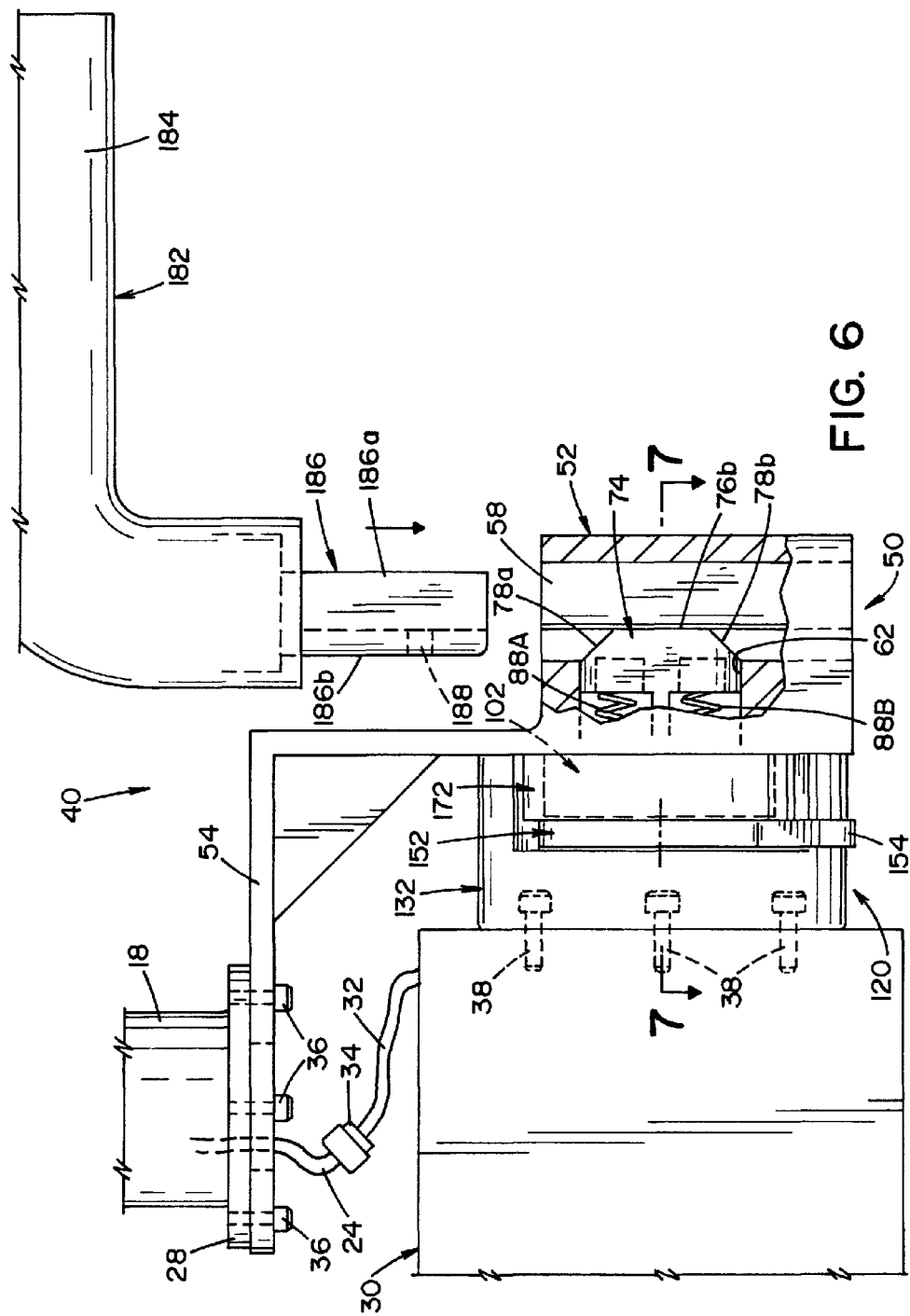
FIG. 6 is a partially sectioned, side-elevational view showing a connection system in a first position and a key member detached from the connection system.
Figure 8:
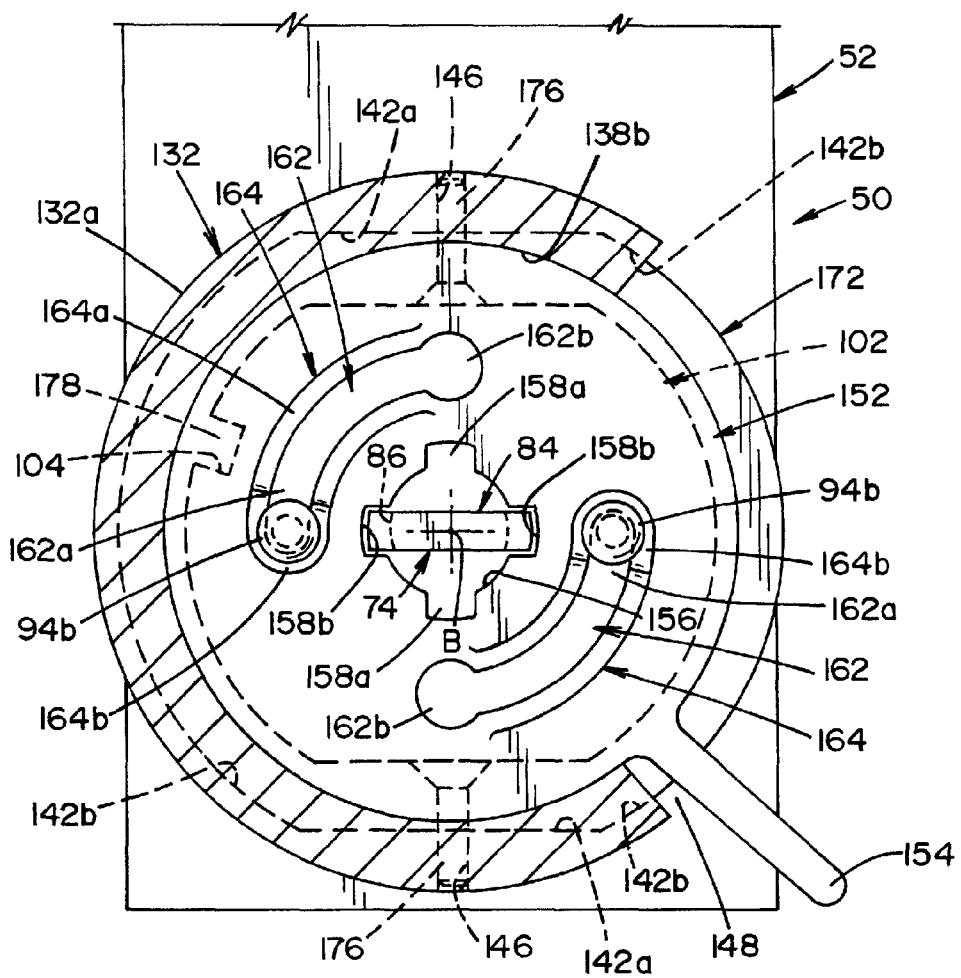
FIG. 8 is a sectional view taken along lines 8-8 in FIG. 7.

Referring now to FIGS. 6-8, connection system 40 is shown with second connection section 120 attached to first connection section 50. In this position, plate 102 of first connection section 50 is received in opening 172a of retaining member 172. Flat outer surfaces 102c and curved outer surfaces 102d of plate 102 are disposed adjacent to flat wall sections 173a and curved, cylindrical wall sections 173b of retaining member 172. Locating key 178 is positioned on retaining member 172 and notch 104 is positioned on plate 102 to ensure that plate 102 is properly oriented relative to retaining member 172, as best seen in FIG. 3.

Referring now to FIG. 7, springs 88A, 88B bias latch 74 to the first latch position, as described above, wherein first end 84a of latch 74 is disposed in notches 158b and hole 156 of actuator 152. Base portion 76 of latch 74 extends into keyway 58 such that ramped portions 78a, 78b are disposed in keyway 58. Throat 86 of latch 74 is disposed in opening 108 of plate 102. In this position, first end 84a of latch 74 prevents actuator 152 from rotating about central axis "B."

Referring now to FIG. 8, actuator 152 is in the first actuator position, as described above, such that lever arm 154 is oriented downwardly and notches 158b of plate 102 and flat surfaces 164b of wall 164 are in the same horizontal plane. In this respect, flat surfaces 164b align with locking pins 92A, 92B. Second ends 94b of pins 92A, 92B are dimensioned to be larger than slot 162 in actuator 152 such that second ends 94b of pins 92A, 92B rest on flat surfaces 164b of actuator 152. As a result, springs 88A, 88B are compressed and pins 92A, 92B are disposed in the first pin position, as described above.

FIGS. 6-8 therefore show connection system 40 in a first position wherein second connection section 120 is locked to first connection section 50 by locking pins 92A, 92B, latch 74 and actuator 152.

Referring now to FIGS. 9-17, the steps of detaching second connection section 120 from first connection section 50 are shown. As stated above, keyed portion 184 of key member 182 is dimensioned to be received into keyway 58 of first connection section 50, as shown in FIGS. 6 and 9. Key member 182 is designed such that the additional weight of key member 182 causes the free end of support arm 10 to move downward to an "attachment/detachment position." In this respect, device 30 and connection system 40 are positioned to allow a user to quickly attach/detach device 30 to/from support arm 10.

Figure 10:
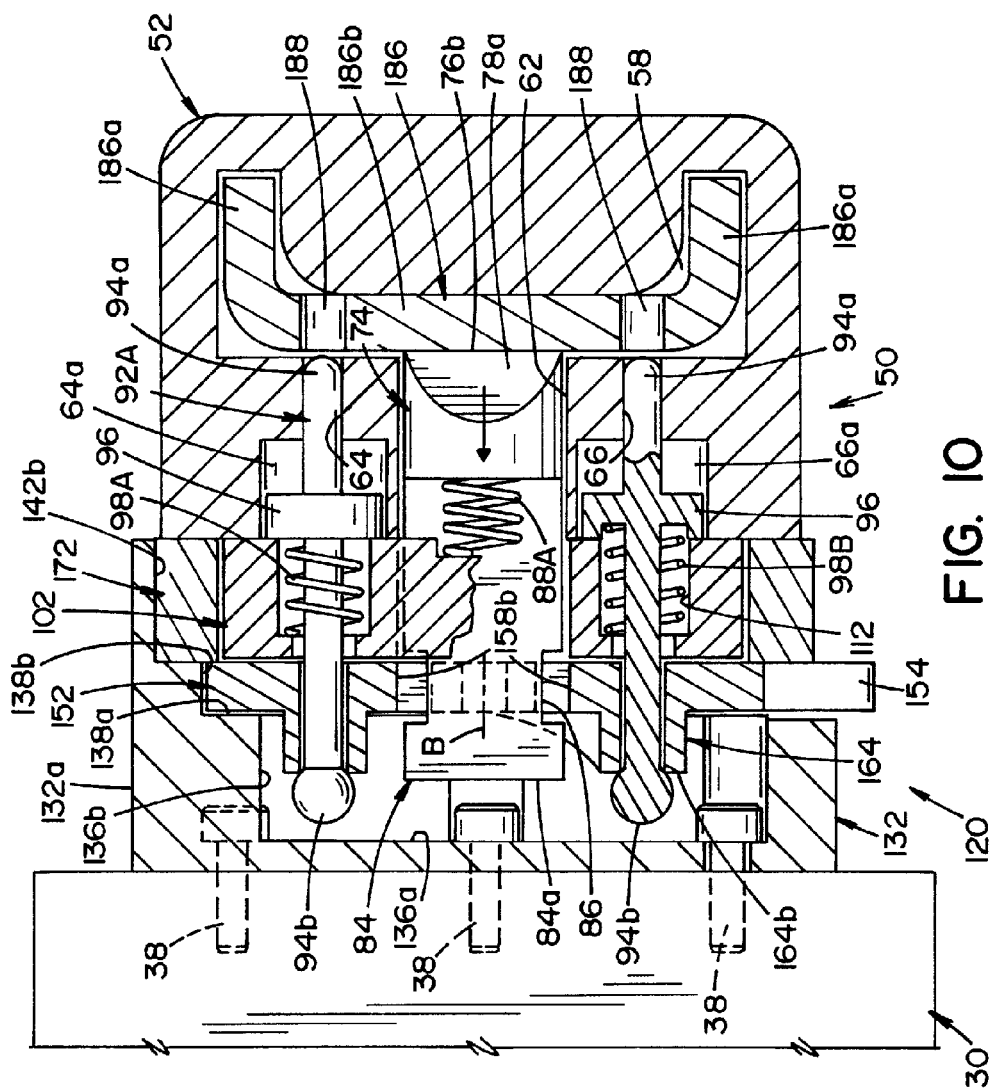
FIG. 10 is an enlarged sectional view taken along lines 10-10 in FIG. 9.

Referring now to FIGS. 9 and 10, keyed portion 186 of key member 182 is shown inserted into keyway 58. As keyed portion 186 is inserted into keyway 58, keyed portion 186 contacts ramped sections 78a of latch 74 and causes latch 74 to slide within opening 62 of body portion 52, as illustrated by an arrow in FIG. 10. When key member 182 is fully inserted into keyway 58, rear surface 76b of latch 74 rests against keyed portion 186 of key member 182. As a result, latch 74 moves from the first latch position, described above, to a second latch position. When latch 74 is in the second latch position, springs 88A, 88B are compressed and throat 86 of latch 74 aligns with actuator 152. In this respect, actuator 152 is free to rotate about central axis "B" of second connection section 120 from the first actuator position to the second actuator position, as described above. As shown in FIG. 10, holes 188 in key member 182 are dimensioned and positioned to be in registry with holes 64, 66 in body portion 52 when keyed portion 186 of key member 182 is fully inserted into keyway 58 of body portion 52.

Figure 11:
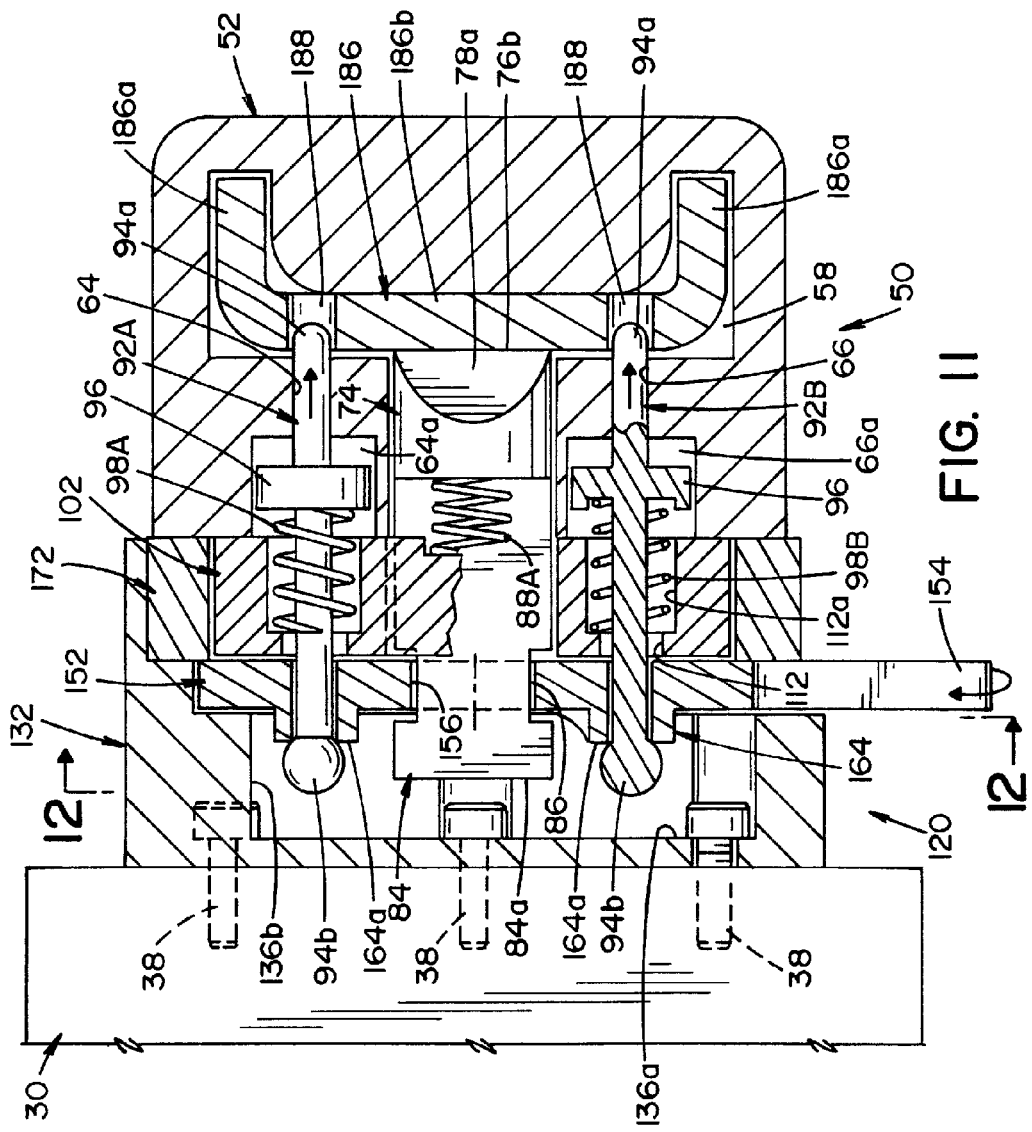
FIG. 11 is sectional view of the connection system in FIG. 10, showing the connection system between a first position and a second position.
Figure 12:
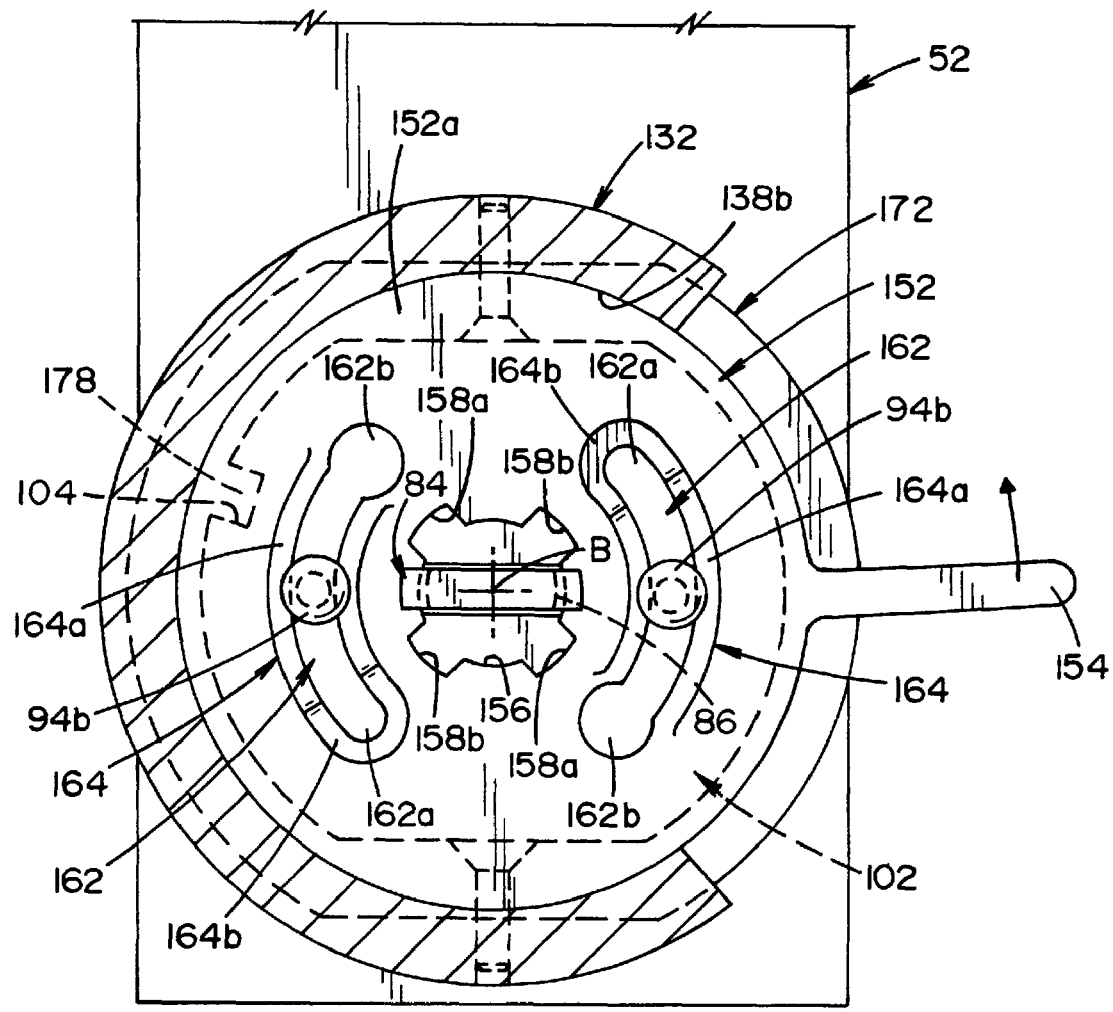
FIG. 12 is a sectional view taken along lines 12-12 in FIG. 11.
Figure 13:
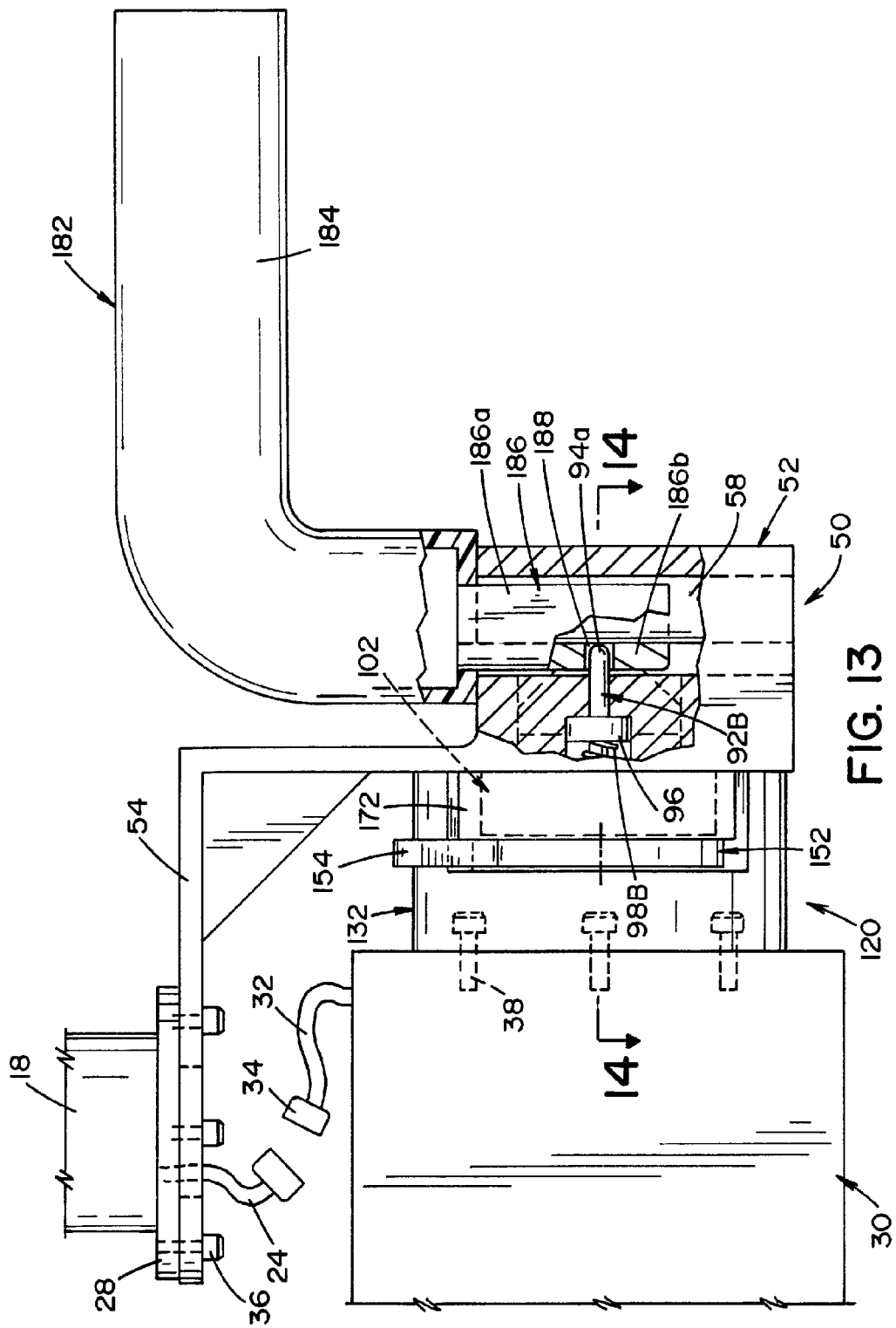
FIG. 13 is a partially sectioned, side-elevational view showing a connection system in a second position, a key member locked to the connection system and a second connection section unlocked from the connection system.

Referring now to FIGS. 11 and 12, as a user moves actuator 152 from the first actuator position to the second actuator position, second ends 94b of pins 92A, 92B move along slots 162 from first end 162a to second end 162b. As stated above, springs 98A, 98B bias pins 92A, 92B to the second pin position. Therefore, as second ends 94b of pins 92A, 92B slide along ramped upper surface 164a of wall 164, springs 98A, 98B cause pins 92A, 92B to move from the first pin position to the second pin position. As pins 92A, 92B move from the first pin position to the second pin position, first ends 94a of pins 92A, 92B move into keyway 58 in body portion 52. More specifically, first ends 94a of pins 92A, 92B move into holes 188 in keyed portion 186 of key member 182.

Figure 14:
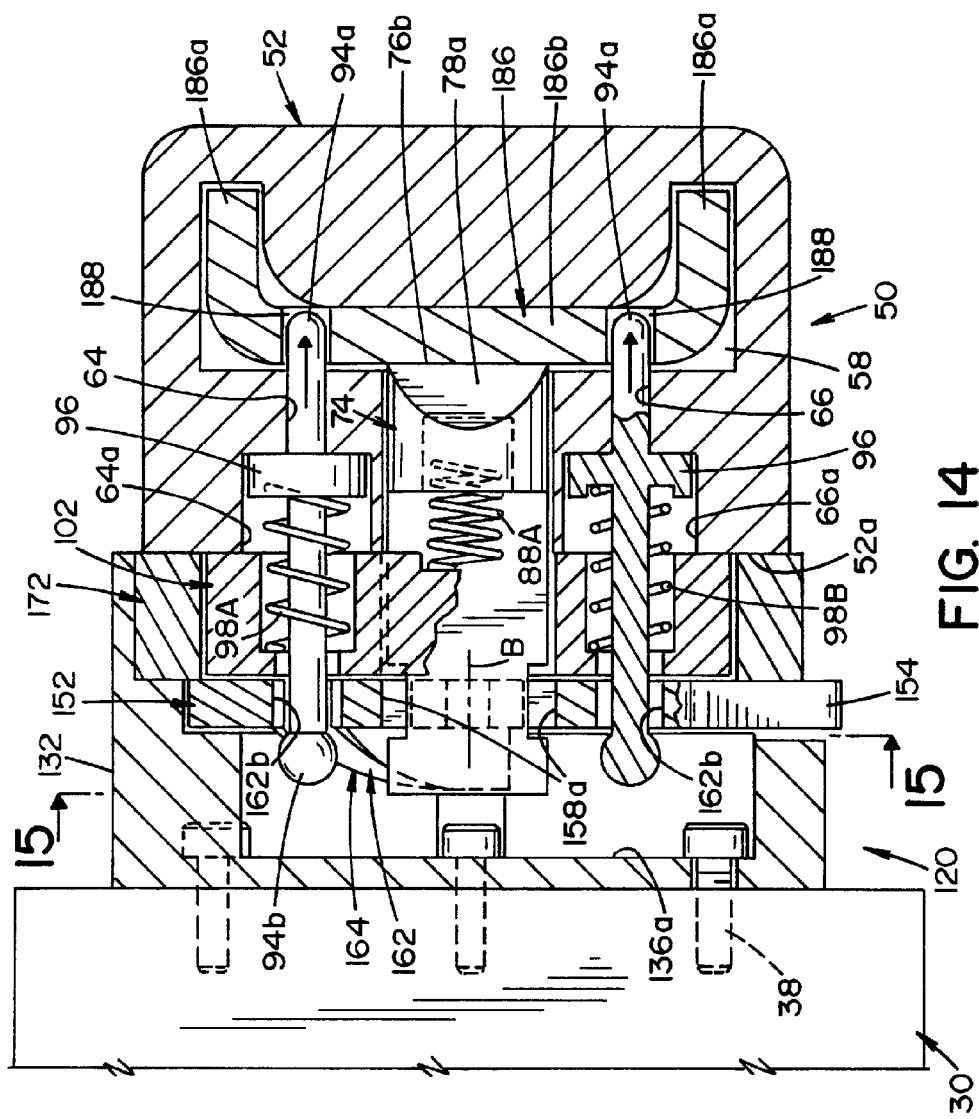
FIG. 14 is an enlarged sectional view taken along lines 14-14 in FIG. 13.
Figure 15:
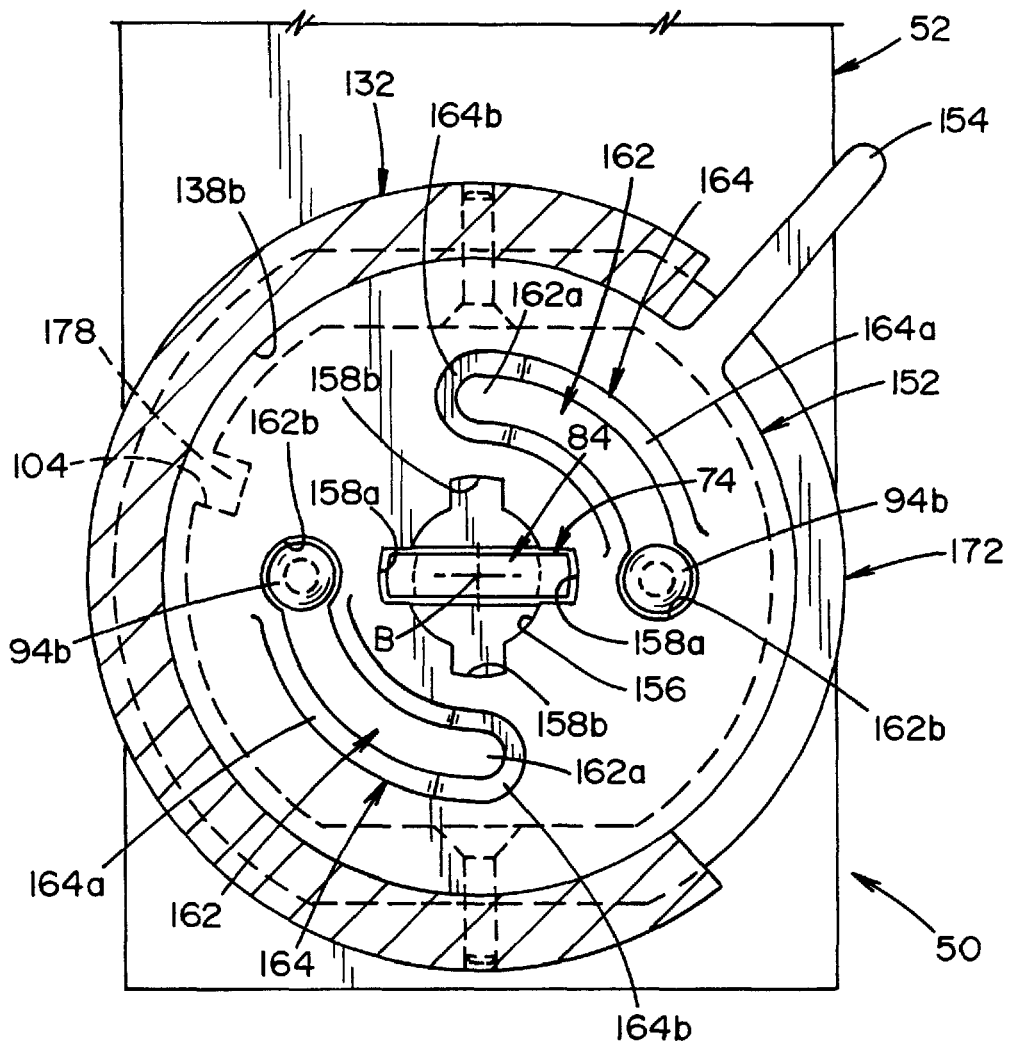
FIG. 15 is a sectional view taken along lines 15-15 in FIG. 14.
Figure 16:
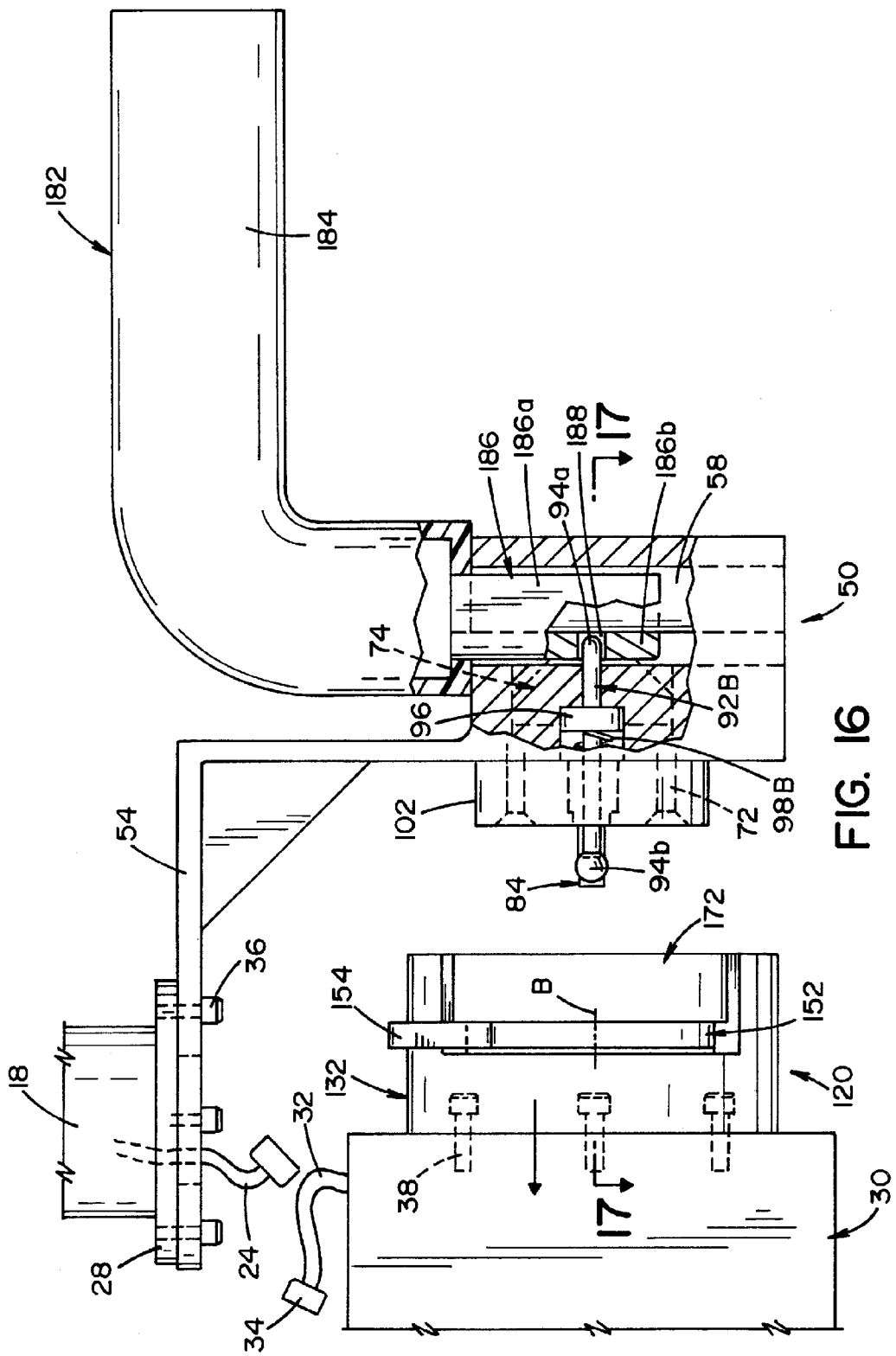
FIG. 16 is a partially sectioned, side-elevational view showing a connection system in a second position, a key member locked to the connection system and a second connection section detached from the connection system.
Figure 17:
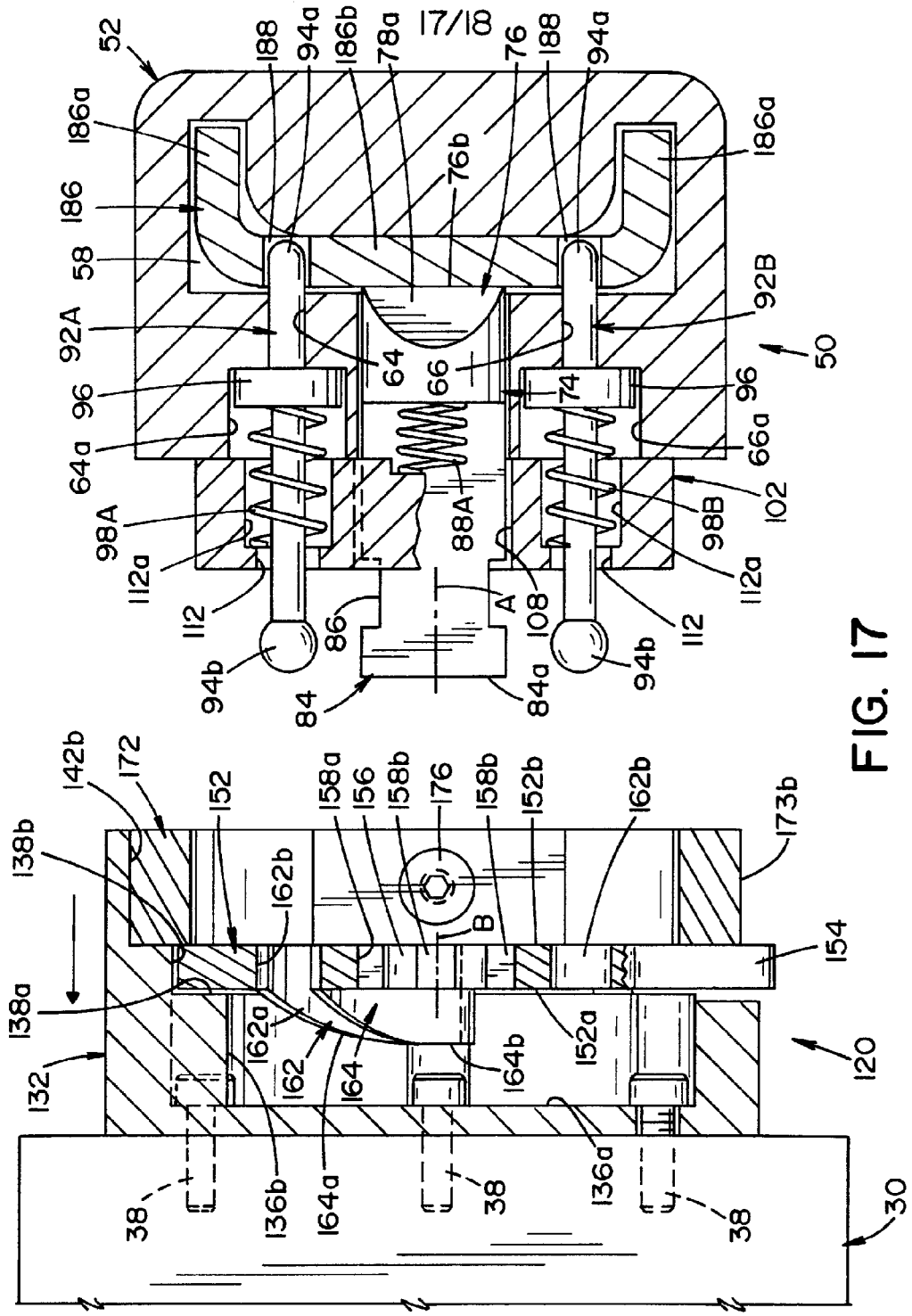
FIG. 17 is an enlarged sectional view taken along lines 17-17 in FIG. 16.

Referring now to FIGS. 13-17, the user continues to rotate actuator 152 until actuator 152 is in the second actuator position, as seen in FIG. 15. When actuator 152 is in the second actuator position, pins 92A, 92B are in a second pin position. As seen in FIGS. 14 and 15, second ends 94b of pins 92A, 92B are aligned with second ends 162b of slots 162 in actuator 152. Second ends 162b allow second ends 94b of pins 92A, 92B to pass therethrough. Notches 158a in actuator 152 are dimensioned and positioned such that first end 84a of latch 74 may pass therethrough. Therefore, as best seen in FIGS. 16 and 17, connection system 40 is in a second position wherein key member 182 is locked to first connection section 50 while second connection section 120, and therefore device 30, is removable from first connection section 50.

In order to attach second connection section 120 to first connection section 50, the aforementioned steps are reversed, i.e., second connection section 120 is positioned to engage first connection section 50, actuator 152 is rotated to the first actuator position, and key member 182 is removed from keyway 58 of first connection section 50. As stated above, first connection section 50 and the associated components therein are designed such that either second connection section 120 or key member 182 is always attached to first connection section 50. In other words, second connection section 120 is locked to first connection section 50 until key member 182 is inserted into first connection section 50 and actuator 152 is rotated to the second actuator position. Similarly, key member 182 is locked to first connection section 50 until second connection section 120 is mated to first connection section 50 and actuator 152 is rotated to the first actuator position. Once key member 182 is withdrawn from first connection section 50, latch 74 moves to the first actuator position thereby locking second connection section 120 to first connection section 50.

The present invention thus provides a connection system 40 for safely and quickly attaching a device 30 to and from a support arm 10. Connection system 40 is designed to lock a device onto a support arm when a key member is removed from a first section of the connection system. Furthermore, connection system 40 is designed to lock a weighted key member to a first section of the connection system 40 prior to allowing a second section, and a device attached thereto, to be detached from the first section.

One advantage of the present invention as described above is that system 40 allows for a user to manipulate an actuator with one hand while using the other hand to support a device to be mounted to a support arm. In this respect, a single user may quickly and safely attach and detach a weighted device to and from a spring-loaded support arm.

Referring to FIG. 18, an alternate embodiment of the present invention system 440 is shown. First connection section 50 includes an electrical connector 202 disposed thereon. A mating electrical connector 204 is disposed on second connection section 120. Electrical connector 202 and electrical connector 204 are dimensioned to matingly engage or disengage at the same time that first connection section 50 is attached to or detached from second connection section 120. In this respect, system 440 is designed to allow a user to quickly and safely electrically attach/detach first connection section 50 to/from second connection section 120.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A connection system for attaching and detaching a device to and from a support arm, comprised of:
a key member having a keyed portion;
a first section attachable to a support arm, said first section dimensioned to receive said keyed portion of said key member;
a second section attachable to a device, said second section dimensioned to attach to said first section;
an actuator disposed on said second section, said actuator operable to move relative to said second section between a first position and a second position when both said keyed portion of said key member and said second section engage said first section, wherein said second section is locked to said first section when said actuator is in said first position and said second section is detachable from said first section when said key member is locked to said first section and said actuator is in said second position;
locking pins disposed in said first section, said locking pins for attaching said second section to said first section and for locking and unlocking said key member to and from said first section; and
a latch disposed in said first section, said latch for locking said second section onto said first section wherein said key member is operable to move said latch between a first latch position and a second latch position and wherein said second section is locked to said first section when said latch is in said first latch position and said actuator is movable between said first position and said second position when said latch is in said second latch position.

2. A connection system as defined in claim 1, wherein said actuator is operable to move said locking pins between a first pin position wherein said second section is locked to said first section and a second pin position wherein said key member is locked to said first section.

3. A system for supporting a medical device, said system comprised of a support arm, a medical device, and a connection system operable to attach and detach said medical device to and from said support arm, said connection system comprised of:
a key member having a keyed portion;
a first section attachable to a support arm, said first section dimensioned to receive said keyed portion of said key member; and
a second section attachable to a medical device, said second section dimensioned to attach to said first section said second section including
an actuator attached thereto, said actuator operable to move relative to said second section to attach and detach said second section to and from said first section when both said key member and said second section engage said first section,
wherein said second section is detachable from said first section and said key member is locked to said first section when said actuator is in a second position and said second section is locked to said first section and said key member is detachable from said first section and from said second section when said actuator is in a first position.

4. A system as defined in claim 3, wherein said actuator is a member rotatably retained in said second section of said connection system.

5. A system as defined in claim 3, wherein said key member includes a weighted material.

6. A system as defined in claim 3, wherein said first section includes a keyway for receiving said keyed portion of said key member.

7. A system as defined in claim 3, wherein said first section includes a bracket, said bracket connecting said first section to said support arm.

8. A system as defined in claim 3, further comprising:
a first electrical connector disposed on said first section; and
a second electrical connector disposed on said second section, wherein said first electrical connector matingly engages said second electrical connector when said first section is attached to said second section.

9. A system for supporting a medical device, said system comprised of a support arm, a medical device, and a connection system operable to attach and detach said medical device to and from said support arm, said connection system comprised of:
a key member having a keyed portion;
a first section attachable to a support arm, said first section dimensioned to receive said keyed portion of said key member;
a second section attachable to a medical device, said second section dimensioned to attach to said first section;
an actuator disposed on said second section, said actuator operable to move relative to said second section to attach and detach said second section to and from said first section when said key member and said second section engage said first section, wherein said second section is detachable from said first section when said key member is locked to said first section and said actuator is in a second position and said second section is locked to said first section when said key member is detached from said first section and said actuator is in a first position;
locking pins disposed in said first section, said locking pins for attaching said second section to said first section and for locking and unlocking said key member to and from said first section; and
a latch disposed in said first section, said latch for locking said second section onto said first section wherein said key member is operable to move said latch between a first latch position and a second latch position and wherein said second section is locked to said first section when said latch is in said first latch position and said actuator is movable between said first position and said second position when said latch is in said second latch position.

10. A system as defined in claim 9, wherein said locking pins have a spherical-shaped end for attaching said second section to said first section.

11. A system as defined in claim 9, wherein said latch is biased into said first latch position.

12. A system as defined in claim 9, wherein said pins have a rod-shaped end for locking said key member into a keyway of said first section.

13. A system as defined in claim 9, wherein said actuator is operable to move said pins between a first pin position wherein said second section is locked to said first section and a second pin position wherein said key member is locked to said first section.

14. A system as defined in claim 13, wherein said pins are biased into said second pin position.

* * * * *